(12) United States Patent
Han et al.

(10) Patent No.: US 11,138,970 B1
(45) Date of Patent: Oct. 5, 2021

(54) SYSTEM, METHOD, AND COMPUTER PROGRAM FOR CREATING A COMPLETE TRANSCRIPTION OF AN AUDIO RECORDING FROM SEPARATELY TRANSCRIBED REDACTED AND UNREDACTED WORDS

(71) Applicant: ASAPP, Inc., New York, NY (US)

(72) Inventors: Kyu Jeong Han, Pleasanton, CA (US); Madison Chandler Riley, San Francisco, CA (US); Tao Ma, Mountain View, CA (US)

(73) Assignee: ASAPP, Inc., New York, NY (US)

( * ) Notice: Subject to any disclaimer, the term of this patent is extended or adjusted under 35 U.S.C. 154(b) by 198 days.

(21) Appl. No.: 16/705,801

(22) Filed: Dec. 6, 2019

(51) Int. Cl.
*G10L 15/22* (2006.01)
*G10L 15/18* (2013.01)
*G06F 21/62* (2013.01)
*G06N 20/00* (2019.01)
*G10L 15/065* (2013.01)
*G10L 15/08* (2006.01)

(52) U.S. Cl.
CPC .......... *G10L 15/18* (2013.01); *G06F 21/6245* (2013.01); *G06N 20/00* (2019.01); *G10L 15/065* (2013.01); *G10L 15/22* (2013.01); *G10L 15/08* (2013.01)

(58) Field of Classification Search
CPC ... G10L 15/26; G10L 2015/088; G10L 15/02; G10L 15/08; G10L 2015/025; G10L 15/04; G10L 15/05; G10L 15/065; G10L 15/063; G10L 15/187; G10L 15/22; G10L 15/28; G10L 2015/223; G10L 2015/226; G10L 21/055; G10L 21/10; G10L 25/18; G10L 25/57; G06F 21/6245; G06F 16/4387; G06F 3/04842; G06N 20/20
USPC ........ 704/270, 270.1, 235, 257, 9, 251, 275, 704/277; 705/255, 700, 716, 723
See application file for complete search history.

(56) References Cited

U.S. PATENT DOCUMENTS 5,649,060 A * 7/1997 Ellozy .................. G11B 27/028
704/278
7,502,741 B2 * 3/2009 Finke .................. G10L 15/1822
704/270

(Continued)

*Primary Examiner* — Vijay B Chawan
(74) *Attorney, Agent, or Firm* — Lessani Law Group, PC

(57) ABSTRACT

The present disclosure relates to a system, method, and computer program for creating a complete transcription of an audio recording from separately transcribed redacted and unredacted words. The system receives an original audio recording and redacts a plurality of words from the original audio recording to obtain a modified audio recording. The modified audio recording is outputted to a first transcription service. Audio clips of the redacted words from the original audio recording are extracted using word-level timestamps for the redacted words. The extracted audio clips are outputted to a second transcription service. The system receives a transcription of the modified audio recording from the first transcription service and transcriptions of the extracted audio clips from the second transcription service. The transcriptions of the extracted audio clips are combined with the transcription of the modified audio recording to obtain a complete transcription of the original audio recording using word-level timestamps.

18 Claims, 3 Drawing Sheets

(56) References Cited

U.S. PATENT DOCUMENTS

| | | | | |
|---|---|---|---|---|
| 7,633,551 B2* | 12/2009 | Sullivan | | H04B 1/66 |
| | | | | 348/512 |
| 8,086,458 B2* | 12/2011 | Finke | | G10L 15/1822 |
| | | | | 704/270 |
| 8,131,545 B1* | 3/2012 | Moreno | | G10L 15/04 |
| | | | | 704/235 |
| 8,230,343 B2* | 7/2012 | Logan | | H04H 20/28 |
| | | | | 715/723 |
| 8,289,366 B2* | 10/2012 | Greenwood | | H04N 7/15 |
| | | | | 348/14.08 |
| 10,572,534 B2* | 2/2020 | Readler | | G06F 16/61 |
| 11,055,055 B1* | 7/2021 | Fieldman | | G06F 3/1454 |
| 2002/0116361 A1* | 8/2002 | Sullivan | | H04N 21/8547 |
| 2005/0117879 A1* | 6/2005 | Sullivan | | H04N 21/8547 |
| | | | | 386/207 |
| 2005/0151880 A1* | 7/2005 | Sullivan | | H04B 1/66 |
| | | | | 348/500 |
| 2007/0011012 A1* | 1/2007 | Yurick | | G10L 15/26 |
| | | | | 704/277 |
| 2008/0092168 A1* | 4/2008 | Logan | | H04N 21/4782 |
| | | | | 725/44 |
| 2012/0278071 A1* | 11/2012 | Garland | | H04M 11/10 |
| | | | | 704/235 |
| 2013/0124984 A1* | 5/2013 | Kuspa | | H04N 21/4307 |
| | | | | 715/255 |
| 2015/0106091 A1* | 4/2015 | Wetjen | | H04M 3/568 |
| | | | | 704/235 |
| 2016/0117339 A1* | 4/2016 | Raskin | | G06F 16/958 |
| | | | | 434/309 |
| 2017/0062010 A1* | 3/2017 | Pappu | | G10L 15/02 |
| 2018/0130484 A1* | 5/2018 | Dimino, Jr. | | H04N 21/4307 |
| 2018/0301143 A1* | 10/2018 | Shastry | | G10L 17/04 |
| 2019/0065515 A1* | 2/2019 | Raskin | | G06F 3/04842 |
| 2021/0233535 A1* | 7/2021 | Shir | | G10L 15/065 |

* cited by examiner

SYSTEM, METHOD, AND COMPUTER PROGRAM FOR CREATING A COMPLETE TRANSCRIPTION OF AN AUDIO RECORDING FROM SEPARATELY TRANSCRIBED REDACTED AND UNREDACTED WORDS

BACKGROUND OF THE INVENTION

1. Field of the Invention

This invention relates generally to automated audio data processing, and more specifically to a system and method for creating a complete transcription of an audio recording from separately transcribed redacted and unredacted words.

2. Description of the Background Art

For various reasons, many companies need to transcribe audio recordings, such as for improved storage, searchability, and record keeping, as a feedback to improve their interactive voice response (IVR) systems, neural networks, automatic speech recognition (ASR) systems, customer service content, etc. Many audio recordings, especially in an IVR context, contain confidential data, such as personally identifiable information or payment card information. This makes it challenging for companies to transcribe their audio recordings due to stricter privacy laws both in the United States and internationally. In fact, not all transcription services are qualified to handle sensitive data, and those that are qualified are typically much more expensive. Therefore, there is a demand for a system and method that can create a complete transcription of an audio recording from separately transcribed redacted and unredacted words, thus enabling a company to protect the privacy of any confidential information during the transcription process.

SUMMARY OF THE DISCLOSURE

The present disclosure describes a system, method, and computer program for creating a complete transcription of an audio recording, where redacted words in the audio recording are transcribed separately from unredacted words. The method is performed by a computer system ("the system"), such as the computer system illustrated in FIG. 2.

Upon receiving an audio recording, the system determines if there is any confidential information, such as personally identifiable information or payment card information, etc., in the audio recording. Once the system identifies the presence of confidential information, it redacts the identified words or phrases and creates word-level time stamps for the redacted words or phrases and for the modified audio recording. The system then extracts audio clips corresponding to the redacted words or phrases using the word-level timestamps. The system sends the modified audio recording and the extracted audio clips to separate transcription services. The transcription services may be third-party transcription services (i.e., an outside company hired to handle the transcription services) or in-house transcription services (i.e., the company itself performing any transcription services) or a combination of the two, so long as the transcription services assigned to transcribe the confidential information contained in the extracted audio clips have an appropriate level of security that is compliant with any applicable privacy laws.

When the system receives the transcribed modified audio recording and the transcribed audio clips back from the separate transcription services, the system combines the two by aligning the word-level timestamps of the transcribed audio clips with the word-level timestamps of the transcribed modified audio recording and inserting the transcriptions of the audio clips into the appropriate locations of the transcription of the modified audio recording so that the combination creates a complete transcription of the original audio recording while enabling the user to protect the privacy of any confidential information during the transcription process.

In one embodiment, a method for creating a complete transcription of an audio recording from separately transcribed redacted and unredacted words comprises the following steps:

receiving an original audio recording;

redacting a plurality of words from the original audio recording to obtain a modified audio recording, wherein word-level timestamps are created for the redacted words;

outputting the modified audio recording to a first transcription service;

extracting audio clips of the redacted words from the original audio recording using the word-level timestamps for the redacted words, wherein each of the extracted audio clips is associated with start and end timestamps based on the word-level timestamps of the one or more redacted words within the extracted audio clip;

outputting the extracted audio clips to a second transcription service;

receiving a transcription of the modified audio recording from the first transcription service;

receiving transcriptions of the extracted audio clips from the second transcription service; obtaining word-level timestamps for the modified audio recording; and combining the transcriptions of the extracted audio clips with the transcription of the modified audio recording to obtain a complete transcription of the original audio recording using the word-level timestamps for the modified audio recording and the start and end timestamps for the extracted audio clips.

DETAILED DESCRIPTION OF THE PREFERRED EMBODIMENTS

The present disclosure describes a system, method, and computer program for creating a complete transcription of an audio recording, where redacted words in the audio recording are transcribed separately from unredacted words. The method is performed by a computer system ("the system"), such as the computer system illustrated in FIG. 2.

Upon receiving an audio recording, the system determines if there is any confidential information, such as personally identifiable information or payment card information, etc., in the recording. In certain embodiments, this is done by applying a named-entity recognition model to a machine transcription of the audio recording. The named-entity recognition model may be calibrated to over-identify for confidential information. Once the system identifies the presence of confidential information, it redacts the identified words or phrases and creates word-level time stamps for the redacted words and for the modified audio recording. The system then extracts audio clips corresponding to the redacted words or phrases using the word-level timestamps. The system sends the modified audio recording and the extracted audio clips to separate transcription services. The transcription services may be third-party transcription services or in-house transcription services or a combination of the two, so long as the transcription services assigned to transcribe the confidential information contained in the extracted audio clips have a higher level of security that is compliant with any applicable privacy laws.

When the system receives the transcribed modified audio recording and the transcribed audio clips back from the separate transcription services, the system combines the two by aligning the word-level timestamps of the transcribed audio clips with the word-level timestamps of the transcribed modified audio recording and inserting the transcriptions of the audio clips into the appropriate locations of the transcription of the modified audio recording so that the combination creates a complete transcription of the original audio recording while enabling the user to protect the privacy of any confidential information during the transcription process.

Figure 1:
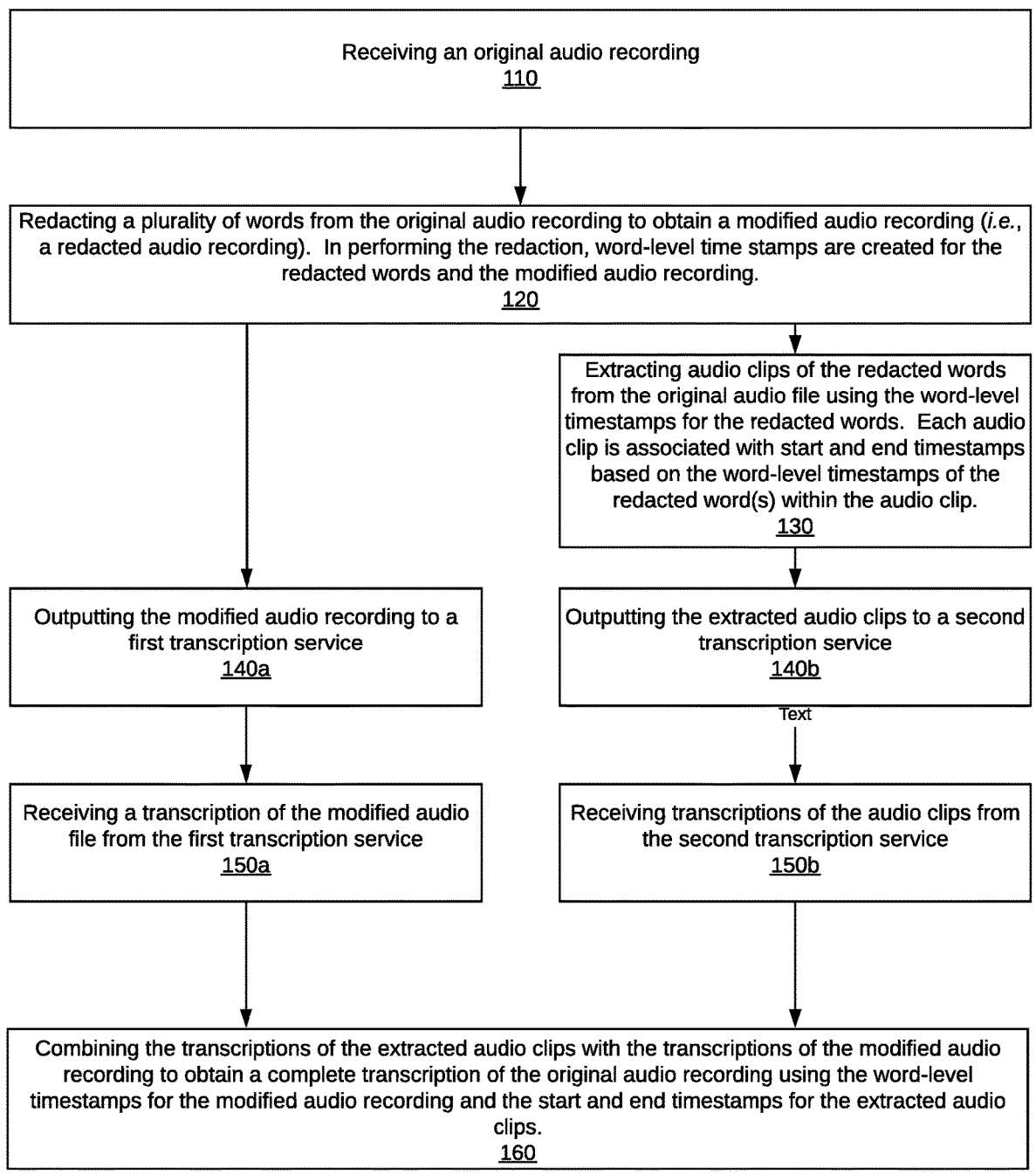
FIG. 1 is a flowchart that illustrates a method, according to one embodiment, for creating a complete transcription of an audio recording, where redacted words in the audio recording are transcribed separately from unredacted words.
Figure 3A:
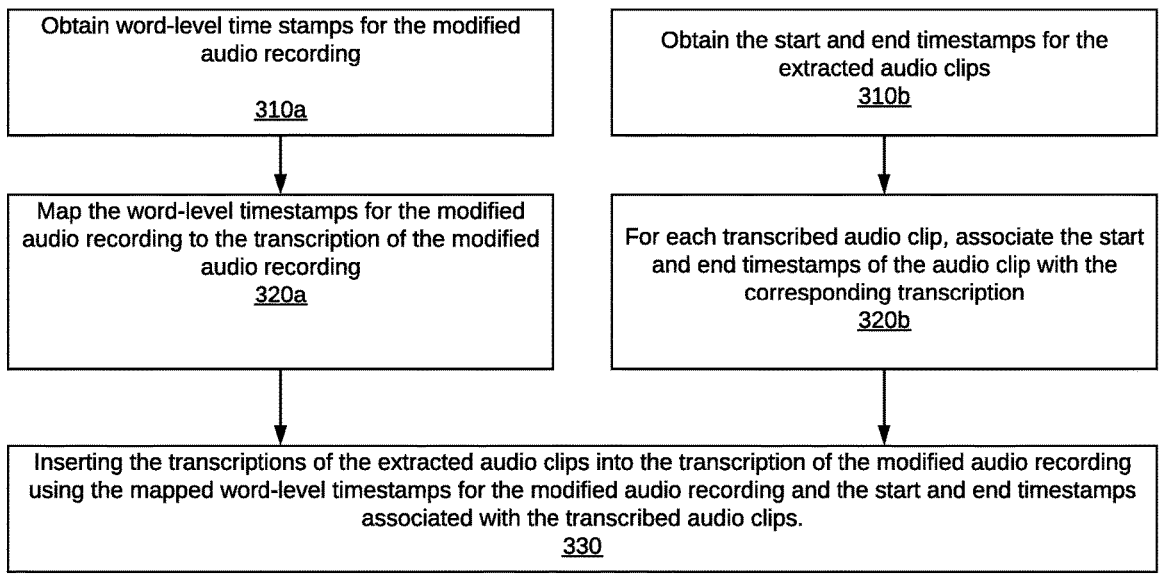
FIGS. 3A-3B are a flowchart and diagram that illustrate an example method, according to one embodiment, for combining the transcriptions.
Figure 3B:
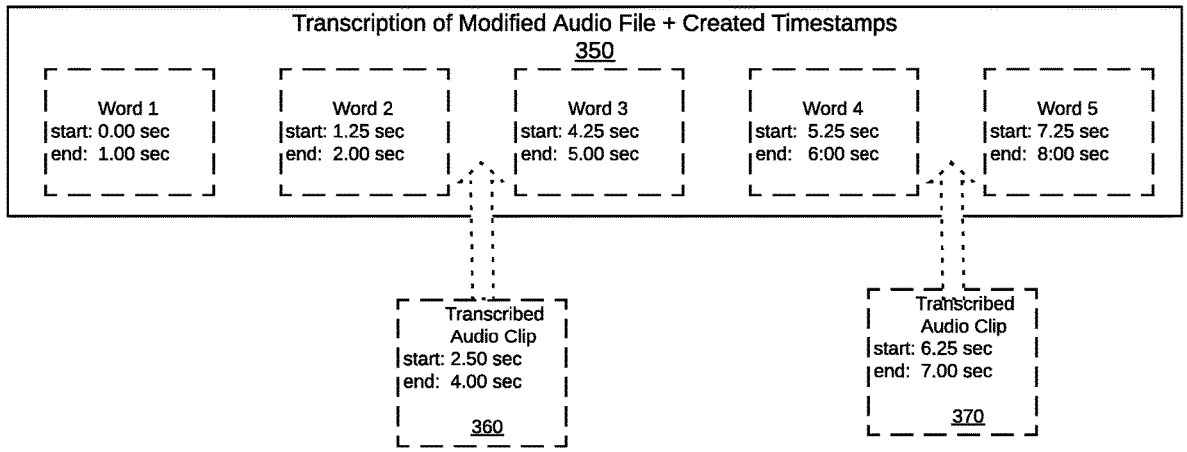

Example implementations of the method are described in more detail with respect to FIGS. 1 and 3A-3B.

FIG. 1 illustrates a method, according to one embodiment, for creating a complete transcription of an audio recording, where redacted words in the audio recording are transcribed separately from unredacted words. In certain embodiments, the redacted words are personally identifiable information (e.g., full name, Social Security number, driver's license number, bank account number, passport number, email address, date of birth, medical records number, etc.) or payment card information (e.g., credit card number, expiration date, card verification value number, etc.). In certain embodiments, the system uses machine learning to identify any personally identifiable information and any payment card information from the original audio recording.

The system receives an original audio recording (step 110). A plurality of words is redacted from the original audio recording to obtain a modified audio recording (i.e., a redacted audio recording) (step 120). In performing the redaction, word-level timestamps are created for the redacted words and the modified audio recording. Word-level timestamps include a start time and an end time that indicate when the audio recording commences and completes playing the word. In certain embodiments, the word-level timestamps for the modified audio recording are obtained by applying a machine speech-to-text model to the transcription of the modified audio recording. This is done by an alignment system in the machine speech-to-text model determining the highest likelihood for the timestamps considering the duration of each word in the transcription).

In certain embodiments, the redacting step includes converting the original audio recording to machine-generated text using a machine speech-to-text model, where the machine generated text includes word-level timestamps. A named-entity recognition model is then applied to the machine-generated text to identify words or phrases for redacting, and the word-level timestamps associated with the identified words or phrases are used to select audio spans for redacting in the original audio recording. In certain embodiments, the system is calibrated to over-identify words or phrases for redaction.

The audio clips of the redacted words are extracted from the original audio file using the word-level timestamps for the redacted words (step 130). The modified audio recording is sent to a first transcription service (step 140a) while the extracted audio clips are sent to a second transcription service (step 140b). A transcription of the modified audio file is received from the first transcription service (step 150a) and the transcriptions of the audio clips are received from the second transcription service (step 150b). The transcriptions of the extracted audio clips are then combined with the transcriptions of the modified audio recording to obtain a complete transcription of the original audio recording using the word-level timestamps for the modified audio recording and the start and end timestamps for the extracted audio clips (step 160).

Figure 2:
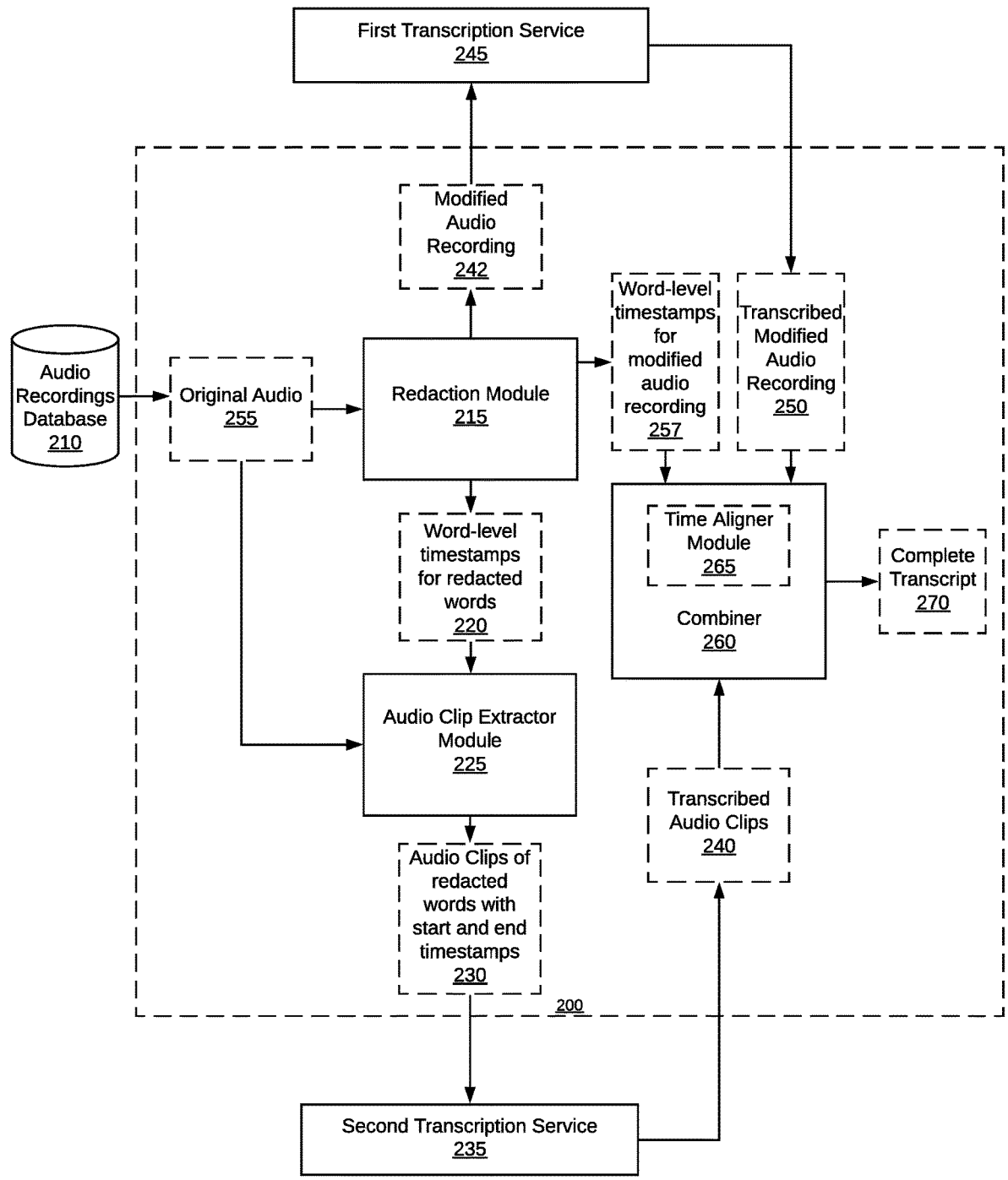
FIG. 2 is a block diagram that illustrates an example software architecture according to one embodiment.

FIG. 2 illustrates an example architecture for a system that performs the methods described herein. However, the methods described herein may be implemented in other systems and are not limited to system 200.

Referring to step 110 above, system 200 receives an original audio recording 255 from audio recording database 210. Referring to step 120 above, redaction module 215 redacts a plurality of words from original audio recording 255 to create modified audio recording 242. In addition, redaction module 215 generates word-level timestamps for the redacted words 220 and the modified audio recording 257.

Referring to step 130 above, audio clip extractor module 225 extracts audio clips of the redacted words from the original audio file 255 using the word-level timestamps for the redacted words 220. Each audio clip 230 is associated with a start and end timestamp based on the word-level timestamp of the redacted word(s) within the audio clip. Referring to steps 140a and 140b above, the modified audio recording 242 is outputted to a first transcription service 245 and the extracted audio clips 230 with the start and end timestamps are outputted to a second transcription service 235. Referring to steps 150a and 150b above, the system 200 receives a transcription 250 of the modified audio file from the first transcription service 245 and transcriptions 240 of the audio clips from the second transcription service 235. Referring to step 160 above and discussed in greater detail with respect to FIGS. 3A-3B below, combiner module 260 combines the transcriptions 240 of the extracted audio clips with the transcription 250 of the modified audio recording to obtain a complete transcription 270 of the original audio recording 255 using a time aligner module 265 to align the word level timestamps for the modified audio recording 242 and the start and end timestamps for the extracted audio clips 230.

FIG. 3A illustrates an example method, according to one embodiment, for combining the transcriptions. The combiner module 260 obtains word-level time stamps for the modified audio recording from the redaction module 215 (step 310a). In some embodiments, combiner module 260 obtains the word-level timestamps for the modified audio recording by applying a machine speech-to-text-model to the transcription of the modified audio recording. The combiner module also obtains start and end timestamps for the redacted words/phrases from the audio clip files (step 310b). The system then maps the word-level timestamps for the modified audio recording to the transcription of the modified audio recording (step 320a). For each transcribed audio clip, the system associates the start and end timestamps of the audio clip with the corresponding transcription (step 320*b*). The transcriptions of the extracted audio clips are then inserted into the transcription of the modified audio recording using the mapped word-level timestamps for the modified audio recording and the start and end timestamps associated with the transcribed audio clips (step 330).

FIG. 3B illustrates a diagram of the transcription of the modified audio recording with the created timestamps 350 being combined with two transcribed audio clips 360, 370. Referring to step 310*a* above, Word 1 is associated with the word-level start timestamp 0.00 seconds and the word-level end timestamp 1.00 seconds. Word 2 is associated with the word-level start timestamp 1.25 seconds and the word-level end timestamp 2.00 seconds. Word 3 is associated with the word-level start timestamp 4.25 seconds and the word-level end timestamp 5.00 seconds. Word 4 is associated with the word-level start timestamp 5.25 seconds and the word-level end timestamp 6.00 seconds. Word 5 is associated with the word-level start timestamp 7.25 seconds and the word-level end timestamp 8.00 seconds. Referring to step 320*a* above, the word-level timestamps for the modified audio recordings are mapped to the transcription of the modified audio recording as shown in 350. Referring to step 310*b* above, the first extracted audio clip is associated with start and end timestamps, 2.50 seconds and 4.00 seconds, respectively, and the second extracted audio clip is associated with start and end timestamps, 6.25 seconds and 7.00 seconds, respectively. Referred to step 320*b* above, the start and end timestamps of the audio clips are associated with their corresponding transcription as seen in 360, 370. Referring to step 330 above, the transcriptions of the extracted audio clips 360, 370 are inserted into the transcription of the modified audio recording using the mapped word-level timestamps for the modified audio recording and the start and end timestamps associated with the transcribed audio clips.

The methods described with respect to FIGS. 1 and 3A-3B are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for creating a complete transcription of an audio recording, wherein redacted words in the audio recording are transcribed separately from unredacted words, the method comprising:
   receiving an original audio recording;
   redacting a plurality of words from the original audio recording to obtain a modified audio recording, wherein word-level timestamps are created for the redacted words;
   outputting the modified audio recording to a first transcription service;
   extracting audio clips of the redacted words from the original audio recording using the word-level timestamps for the redacted words, wherein each of the extracted audio clips is associated with start and end timestamps based on the word-level timestamps of the one or more redacted words within the extracted audio clip;
   outputting the extracted audio clips to a second transcription service;
   receiving a transcription of the modified audio recording from the first transcription service;
   receiving transcriptions of the extracted audio clips from the second transcription service;
   obtaining word-level timestamps for the modified audio recording; and
   combining the transcriptions of the extracted audio clips with the transcription of the modified audio recording to obtain a complete transcription of the original audio recording using the word-level timestamps for the modified audio recording and the start and end timestamps for the extracted audio clips.

2. The method of claim 1, wherein the combining steps comprises:
   mapping the word-level timestamps for the modified audio recording to the transcription of the modified audio recording;
   associating the start and end timestamps for the extracted audio clips with the corresponding transcriptions of the audio clips; and
   inserting the transcriptions of the extracted audio clips into the transcription of the modified audio recording using the start and end timestamps associated with the transcriptions of the audio clips and the word-level timestamps mapped to the transcription of the modified audio recording.

3. The method of claim 1, wherein the redacted words are personally identifiable information or payment card information.

4. The method of claim 3, further comprising using machine learning to identify any personally identifiable information and any payment card information from the original audio recording.

5. The method of claim 1, wherein the redacting step comprises:
   converting the original audio recording to machine-generated text using a machine speech-to-text model, wherein the machine generated text includes word-level timestamps;
   applying a named-entity recognition model to the machine-generated text to identify words or phrases for redacting; and
   using the word-level timestamps associated with the identified words or phrases to select audio spans for redacting in the original audio recording.

6. The method of claim 1, wherein the word-level timestamps for the modified audio recording are obtained by applying a machine speech-to-text model to the modified audio recording.

7. A non-transitory computer-readable medium comprising a computer program, that, when executed by a computer system, enables the computer system to perform the following steps for creating a complete transcription of an audio recording, wherein redacted words in the audio recording are transcribed separately from unredacted words, the steps comprising:
   receiving an original audio recording;
   redacting a plurality of words from the original audio recording to obtain a modified audio recording, wherein word-level timestamps are created for the redacted words;

outputting the modified audio recording to a first transcription service;
extracting audio clips of the redacted words from the original audio recording using the word-level timestamps for the redacted words, wherein each of the extracted audio clips is associated with start and end timestamps based on the word-level timestamps of the one or more redacted words within the extracted audio clip;
outputting the extracted audio clips to a second transcription service;
receiving a transcription of the modified audio recording from the first transcription service;
receiving transcriptions of the extracted audio clips from the second transcription service;
obtaining word-level timestamps for the modified audio recording; and
combining the transcriptions of the extracted audio clips with the transcription of the modified audio recording to obtain a complete transcription of the original audio recording using the word-level timestamps for the modified audio recording and the start and end timestamps for the extracted audio clips.

8. The non-transitory computer-readable medium of claim 7, wherein the combining steps comprises:
mapping the word-level timestamps for the modified audio recording to the transcription of the modified audio recording;
associating the start and end timestamps for the extracted audio clips with the corresponding transcriptions of the audio clips; and
inserting the transcriptions of the extracted audio clips into the transcription of the modified audio recording using the start and end timestamps associated with the transcriptions of the audio clips and the word-level timestamps mapped to the transcription of the modified audio recording.

9. The non-transitory computer-readable medium of claim 7, wherein the redacted words are personally identifiable information or payment card information.

10. The non-transitory computer-readable medium of claim 9, further comprising using machine learning to identify any personally identifiable information and any payment card information from the original audio recording.

11. The non-transitory computer-readable medium of claim 7, wherein the redacting step comprises:
converting the original audio recording to machine-generated text using a machine speech-to-text model, wherein the machine generated text includes word-level timestamps;
applying a named-entity recognition model to the machine-generated text to identify words or phrases for redacting; and
using the word-level timestamps associated with the identified words or phrases to select audio spans for redacting in the original audio recording.

12. The non-transitory computer-readable medium of claim 7, wherein the word-level timestamps for the modified audio recording are obtained by applying a machine speech-to-text model to the modified audio recording.

13. A computer system for creating a complete transcription of an audio recording, wherein redacted words in the audio recording are transcribed separately from unredacted words, the system comprising:
one or more processors;
one or more memory units coupled to the one or more processors, wherein the one or more memory units store instructions that, when executed by the one or more processors, cause the system to perform the operations of:
receiving an original audio recording;
redacting a plurality of words from the original audio recording to obtain a modified audio recording, wherein word-level timestamps are created for the redacted words;
outputting the modified audio recording to a first transcription service;
extracting audio clips of the redacted words from the original audio recording using the word-level timestamps for the redacted words, wherein each of the extracted audio clips is associated with start and end timestamps based on the word-level timestamps of the one or more redacted words within the extracted audio clip;
outputting the extracted audio clips to a second transcription service;
receiving a transcription of the modified audio recording from the first transcription service;
receiving transcriptions of the extracted audio clips from the second transcription service;
obtaining word-level timestamps for the modified audio recording; and
combining the transcriptions of the extracted audio clips with the transcription of the modified audio recording to obtain a complete transcription of the original audio recording using the word-level timestamps for the modified audio recording and the start and end timestamps for the extracted audio clips.

14. The computer system of claim 13, wherein the combining steps comprises:
mapping the word-level timestamps for the modified audio recording to the transcription of the modified audio recording;
associating the start and end timestamps for the extracted audio clips with the corresponding transcriptions of the audio clips; and
inserting the transcriptions of the extracted audio clips into the transcription of the modified audio recording using the start and end timestamps associated with the transcriptions of the audio clips and the word-level timestamps mapped to the transcription of the modified audio recording.

15. The computer system of claim 13, wherein the redacted words are personally identifiable information or payment card information.

16. The computer system of claim 15, further comprising using machine learning to identify any personally identifiable information and any payment card information from the original audio recording.

17. The computer system of claim 13, wherein the redacting step comprises:
converting the original audio recording to machine-generated text using a machine speech-to-text model, wherein the machine generated text includes word-level timestamps;
applying a named-entity recognition model to the machine-generated text to identify words or phrases for redacting; and
using the word-level timestamps associated with the identified words or phrases to select audio spans for redacting in the original audio recording.

18. The computer system of claim 13, wherein the word-level timestamps for the modified audio recording are obtained by applying a machine speech-to-text model to the modified audio recording.

\* \* \* \* \*